US012554128B2

(12) United States Patent
Paille et al.

(10) Patent No.: US 12,554,128 B2
(45) Date of Patent: Feb. 17, 2026

(54) METHOD OF DETERMINING AN ATTITUDE OF AN EYEWEAR

(71) Applicant: Essilor International, Charenton-le-Pont (FR)

(72) Inventors: Damien Paille, Charenton-le-Pont (FR); Daniel Spiegel, Singapore (SG); Yu Richard Liu, Singapore (SG); Gilles Garcin, Singapore (SG); Denis Rousseau, Charenton-le-Pont (FR)

(73) Assignee: Essilor International, Charenton-le-Pont (FR)

( * ) Notice: Subject to any disclaimer, the term of this patent is extended or adjusted under 35 U.S.C. 154(b) by 400 days.

(21) Appl. No.: 17/996,884

(22) PCT Filed: Apr. 22, 2021

(86) PCT No.: PCT/EP2021/060519
§ 371 (c)(1),
(2) Date: Oct. 21, 2022

(87) PCT Pub. No.: WO2021/214210
PCT Pub. Date: Oct. 28, 2021

(65) Prior Publication Data
US 2023/0141415 A1 May 11, 2023

(30) Foreign Application Priority Data

Apr. 24, 2020 (EP) .................................... 20305402

(51) Int. Cl.
G02B 27/00 (2006.01)
G06F 3/01 (2006.01)

(52) U.S. Cl.
CPC ......... *G02B 27/0093* (2013.01); *G06F 3/012* (2013.01)

(58) Field of Classification Search
None
See application file for complete search history.

(56) References Cited

U.S. PATENT DOCUMENTS 9,341,843 B2 * 5/2016 Border .................... G06F 3/013
9,366,862 B2 * 6/2016 Haddick ................. G06F 3/011
(Continued)

FOREIGN PATENT DOCUMENTS

CN       103262520 A     8/2013
CN       104159499 A     11/2014
(Continued)

OTHER PUBLICATIONS

Office Action issued Dec. 14, 2023, in corresponding European Patent Application No. 21 720 474.2, 4 pages.
(Continued)

*Primary Examiner* — Talha M Nawaz
(74) *Attorney, Agent, or Firm* — Oblon, McClelland, Maier & Neustadt, L.L.P.

(57) ABSTRACT

An aspect of the disclosure relates to a method of determining an attitude of an eyewear. The method may include: detecting a light signal reflected from the eyewear with a digital device including a light sensor for a non-visible wavelength range; and calculating, using the light signal, an attitude of the eyewear. The attitude may be at least one of: a yaw angle, a pitch angle, a roll angle. A second aspect of the disclosure relates to an eyewear including at least a first lens. The first lens may include a first coating having reflection in the non-visible range of wavelengths. The first coating may further include a pattern with an orientation. A third aspect of the disclosure relates to a computer program product including instructions, which, when the program is executed by a digital device, causes the digital device to carry out the method.

12 Claims, 11 Drawing Sheets

(56) References Cited

U.S. PATENT DOCUMENTS

| | | | |
|---|---|---|---|
| 10,247,613 B1 | 4/2019 | Wald et al. | |
| 10,503,248 B1 | 12/2019 | Yoon | |
| 10,539,787 B2* | 1/2020 | Haddick | G06F 3/0428 |
| 11,108,977 B1* | 8/2021 | Sharma | G02B 27/0172 |
| 11,526,017 B2* | 12/2022 | Kamakura | G02B 6/0086 |
| 2003/0063292 A1 | 4/2003 | Mostafavi | |
| 2005/0201613 A1 | 9/2005 | Mostafavi | |
| 2007/0139775 A1 | 6/2007 | Reich et al. | |
| 2010/0092747 A1 | 4/2010 | Chung et al. | |
| 2010/0103516 A1 | 4/2010 | McKnight et al. | |
| 2010/0151213 A1 | 6/2010 | Smithson et al. | |
| 2012/0249797 A1* | 10/2012 | Haddick | G04G 21/04 |
| | | | 701/491 |
| 2013/0127980 A1* | 5/2013 | Haddick | G06F 3/013 |
| | | | 348/14.08 |
| 2013/0278631 A1* | 10/2013 | Border | G06F 3/04842 |
| | | | 345/633 |
| 2014/0285889 A1 | 9/2014 | Smithson et al. | |
| 2016/0195736 A1* | 7/2016 | Iordanis | G02C 5/008 |
| | | | 351/44 |
| 2016/0209648 A1* | 7/2016 | Haddick | G04G 21/025 |
| 2017/0049309 A1* | 2/2017 | Lepple-Wienhues | |
| | | | A61B 5/0084 |
| 2017/0161593 A1 | 6/2017 | Smithson et al. | |
| 2018/0232047 A1 | 8/2018 | Yoon | |
| 2019/0156100 A1* | 5/2019 | Rougeaux | G06V 40/161 |
| 2020/0279401 A1 | 9/2020 | Tsuchie | |
| 2023/0288618 A1* | 9/2023 | Lev | G02B 5/122 |

FOREIGN PATENT DOCUMENTS

| | | |
|---|---|---|
| CN | 104244806 A | 12/2014 |
| CN | 106226730 A | 12/2016 |
| CN | 108475109 A | 8/2018 |
| CN | 110073280 A | 7/2019 |
| EP | 1 798 670 A1 | 6/2007 |
| WO | WO 2012/047340 A1 | 4/2012 |
| WO | WO 2019/064399 A1 | 4/2019 |

OTHER PUBLICATIONS

International Search Report issued Jul. 14, 2021 in PCT/EP2021/060519 filed on Apr. 22, 2021, 5 pages.

Combined Chinese Office Action and Search Report issued Mar. 19, 2025, in corresponding Chinese Patent Application No. 202180028536.2 (with English Translation), 16 pages.

* cited by examiner

METHOD OF DETERMINING AN ATTITUDE OF AN EYEWEAR

TECHNICAL FIELD

This disclosure relates to a method of determining an attitude of an eyewear, an eyewear including at least a first lens for use with the method, and a computer program product including instructions to carry out the method.

BACKGROUND

Determination of a person's head attitude involves obtaining images from the person's head, and processing the image with computing algorithms that require a high amount of power. Thus, continuous measure determination of a person's head attitude, even with optimized algorithms, is an important factor contributing to lower device energy efficiency, and in case of battery powered devices, faster drain of battery.

Thus, it is desired to improve the energy efficiency of determination of a person's head attitude by a digital device.

SUMMARY

The present disclosure relates to determination of an attitude of an eyewear, providing several solutions including, among others, a method for the determination of an attitude of a person's head, when the person is wearing the eyewear, with improved energy efficiency.

An aspect of the disclosure relates to a method of determining an attitude of an eyewear. The method may include detecting a light signal with a digital device including a light sensor for a non-visible wavelength range. The method may further include calculating, using the light signal, an attitude of the eyewear. The light signal may be signal reflected from the eyewear when the eyewear is within a sensor range. The attitude may be at least one of: a yaw angle, a pitch angle, a roll angle.

According to various embodiments, the method may further include determining, using the light signal, a distance between the digital device and the eyewear.

According to various embodiments, the method may further include determining reference coordinates of the digital device; and using the reference coordinates for calculating the attitude of the eyewear.

According to various embodiments, the light signal may include a first signal and a second signal. The eyewear may be configured to reflect light of the first signal and of the second signal. The first signal may be reflected by a first coating at a first location of the eyewear, and the second signal may be reflected by a second coating at a second location of the eyewear.

According to various embodiments, the first signal may be of a first wavelength and the second signal may be of a second wavelength different from the first wavelength.

According to various embodiments, the light signal may include a first signal of a first wavelength and a second signal of a second wavelength different from the first wavelength, and wherein the light sensor detects the first light signal and the second light signal.

According to some embodiments, the first coating may be at a first location of the frame. Alternatively or in addition, the first coating may be at a first lens.

According to some embodiments, the first coating may be at a first location of the frame and the second coating may be at a second location of the frame. Alternatively or in addition, the first coating may be at a first lens and the second coating may be at a second lens. In yet other alternative, the first coating may be at a first location of and the second coating may be at a second location, the first and the second location being on a same lens.

According to various embodiments, the eyewear may be configured to reflect light of the first wavelength and of the second wavelength.

According to various embodiments, the first signal may be reflected by a first coating at a first location of the eyewear, and the second signal may be reflected by a second coating at a second location of the eyewear.

According to various embodiments, a pre-determined distance between the first location and the second location may be used for calculating the attitude of the eyewear.

According to various embodiments, the method may include determining the yaw angle. According to various embodiments, determining the yaw angle may include determining, with the first light signal, a first relative distance between the eyewear to the sensor. Determining the yaw angle may further include determining, with the second light signal, a second relative distance between the eyewear to the sensor. Determining the yaw angle may further include using the first relative distance and the second relative distance to calculate the yaw angle.

According to various embodiments, the method may include determining the pitch angle. According to various embodiments, determining the pitch angle may include determining, with the first light signal, a first deviation from a first maximal signal intensity. Determining the pitch angle may further include determining, with the second light signal, a second deviation from a second maximal signal intensity. Determining the pitch angle may further include using the first deviation and the second deviation to calculate the pitch angle.

According to various embodiments, the method may include determining the roll angle. According to various embodiments, determining the roll angle may include determining, with the first light signal, a first deviation from a first maximal signal intensity. Determining the roll angle may further include determining, with the second light signal, a second deviation from a second maximal signal intensity. Determining the roll angle may further include using the first deviation and the second deviation to calculate the roll angle.

According to some embodiments detecting a light signal may include capturing an image of a pattern of the eyewear, and calculating the attitude of the eyewear may include: determining a deviation between the captured image and a pre-determined pattern; and using the deviation to calculate the attitude.

According to some embodiments the attitude may include the roll angle and wherein determining the deviation may include identifying an orientation of the pattern; and wherein calculating the roll angle may include calculating the angular difference of the orientation using the pre-determined pattern as reference.

According to some embodiments determining the deviation may include identifying a first dimension and a second dimension of the pattern, wherein the first dimension and the second dimension intersect, and wherein the attitude may include one or both of the pitch angle and the yaw angle, and calculating on or both of the pitch angle and the yaw angle may include calculating the difference of the first dimension and/or the second dimension from the pre-determined pattern.

According to various embodiments, the light sensor may be selected from at least one of: an infrared camera, an infrared time-of-flight sensor, a non-imaging sensor, or a combination thereof. The non-imaging sensor may be a non-imaging infrared sensor, for example a non-imaging infrared photodiode, or a non-imaging infrared time-of-flight sensor.

A second aspect of the disclosure relates to an eyewear including at least a first lens. The first lens may include a first coating having reflection in the non-visible range of wavelengths. The first coating may further include a pattern with an orientation.

According to various embodiments, the pattern may be free of any rotational symmetry of order greater than 8.

According to various embodiments, the eyewear may further include a second lens, and the second lens may have a second coating. The second coating may have a same pattern of the first lens. In some embodiments, the pattern of the second coating may be a mirrored pattern of the first coating.

According to various embodiments, the first coating and the second coating may have different reflectance spectra. According to various embodiments, each of the first coating and the second coating have regions of different reflectance spectra.

A third aspect of the disclosure concerns an eyewear including at least a first coating having reflection in the non-visible range of wavelengths, and further including a frame, e.g. for holding lens, the frame including the first coating. Alternatively or in addition, the frame may include a second coating.

According to various embodiments, the first coating and the second coating may have different reflectance spectra. Each of the first coating and the second coating may have regions of different reflectance spectra. The coating may be an AR coating, the AR coating may include a reflectance peak in the near infrared spectrum.

A fourth aspect of the disclosure relates to a computer program product including instructions which, when the program is executed by a digital device, causes the digital device to carry out the method according to various embodiments, of the first aspect.

According to various embodiments, the instructions may further include determining a difference between the attitude and a pre-determined attitude reference. The instructions may further include initiating a user alert when the difference is larger than a pre-determined threshold.

According to various embodiments, at least one lens of the eyewear has an IR reflective coating. This coating is partly or totally polarized, and the polarization angle can be different for each lens. A separate device that can be attached to a smartphone or a tablet include one or more IR emitter, and one or more receivers, with optional polarized filters. Depending on the amount of the light received by the receiver, one can compute the distance and different orientation angles (yaw, pitch, roll) of the lens.

BRIEF DESCRIPTION OF THE DRAWINGS

Embodiments of the invention will now be described, by way of example, and with reference to the following drawings in which.

DETAILED DESCRIPTION

Figure 1:
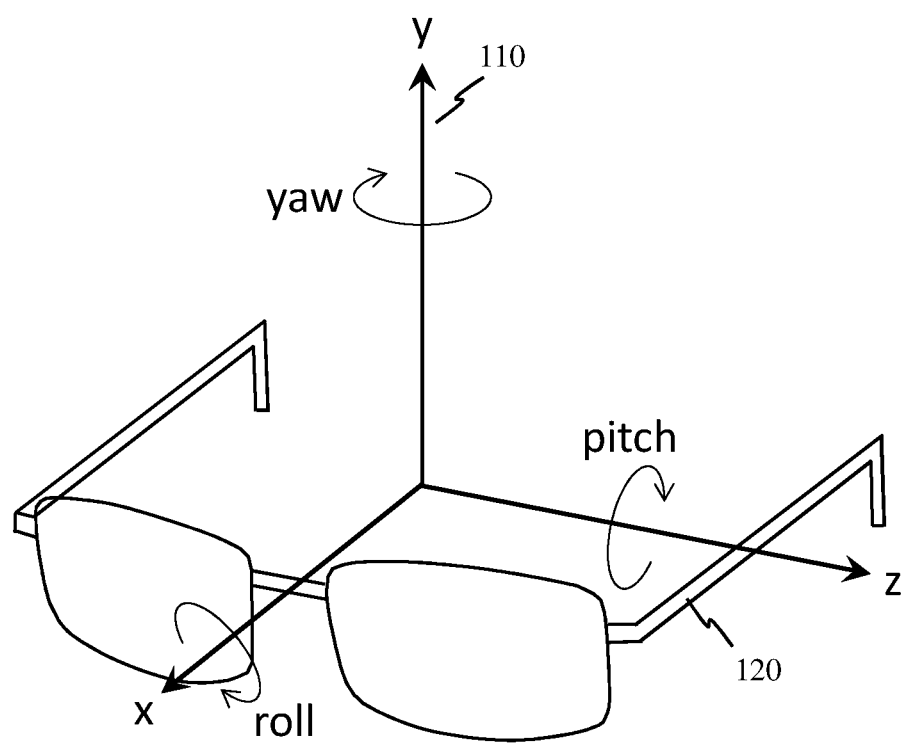
FIG. 1 shows a schematic illustration of an eyewear 120 with respect to a coordinate system 110 having an x-axis (x), a y-axis (y), and a z-axis (z) in accordance with various embodiments.

In the description, which follows, the drawings are not necessarily to scale and certain features may be shown in generalized or schematic form in the interest of clarity and conciseness or for informational purposes. In addition, although making and using various embodiments are discussed in detail below, it should be appreciated that as described herein are provided many inventive concepts that may be embodied in a wide variety of contexts. Embodiments discussed herein are merely representative and not limiting.

Various embodiments disclosed herein relate to the various aspects of the disclosure such the method of determining an attitude of an eyewear, the computer program product including instructions to carry out the method, and the eyewear. Embodiments and explanations thereof disclosed in connection with one embodiment may be applicable to other embodiments. For example, embodiments and explanations to the method may be applicable to the eyewear.

As used herein, the term "and/or" includes any and all combinations of one or more of the associated listed items.

Various embodiments also concern a digital device including an integrated light sensor, or being couplable with a light sensor, or wherein the light sensor is partially integrated in the digital device and a part of the light sensor is coupleable with the digital device. Examples of the digital device are: mobile phone, tablet, smartwatch, handheld device, laptop, electronic wearable device. The term "coupleable" may mean able to communicate with, for example, to transfer information, and may further mean able to be mechanically attached.

The term "eyewear", as used herein, and in accordance with various embodiments, may refer to an optical article configured to be worn by a user on/in relation to the eye, for example, in front of a user's eye. For example, the eyewear may be selected from the group of: spectacle, sunglass, head mounted device, augmented reality device, virtual reality device, contact lens, pair of contact lenses. According to various embodiments, the eyewear may be electronically passive (i.e., not electronically powered). A "lens", according to various embodiments, may have corrective power or may not have corrective power (e.g., a plano lens).

The expression "visible spectrum", as used herein and according to various embodiments, may be defined as light having wavelength in vacuum from 380 nm to 780 nm.

The expression "coating", as used herein and according to various embodiments, may include the meaning of depositing a material so as to form a layer (e.g., a material from solution to form a layer on a frame or lens), and may include the meaning of laminating a pre-formed layer, e.g. as in affixing a security tape on a frame, or adhesive fixing an AR coating, formed on a temporary substrate, on a lens or a frame. A few, non-limiting, examples of depositing a material so as to form a layer are: spin coating, sputtering, physical vacuum deposition.

The expression "near infrared spectrum" (or abbreviated NIR spectrum), as used herein and according to various embodiments, may be defined as light having a wavelength in vacuum longer than 780 nm and shorter or equal to 1400 nm, for example shorter than 1100 nm, optionally from 800 nm to 1000 nm. The term "infrared" may include the near infrared. For example, an infrared sensor may be a near infrared sensor.

The expression "light of a [or the] first wavelength" (or second) may mean that light includes in its spectrum the first (second) wavelength, for example, having an intensity peak at the first (second) wavelength.

It is understood that any reference herein to a "frame" is to a portion of the eyewear which is non-lens portion, for example an eyeglass as in an eyewear may include a frame and may include lenses attached to the frame, if not otherwise explicitly indicated, the lenses are not part of the frame.

According to various embodiments, detecting a light signal is understood to include the meaning of detecting the light signal from a reference point which is facing the front side of the eyewear. The front side is opposed to the inner side, which faces a user when the user is wearing the eyewear. The reference outside of the eyewear may be physically separated from the eyewear.

According to various embodiments, attitude parameters may be at least one of a yaw angle, a pitch angle, and a roll angle. Thus, an attitude of an eyewear may be defined by at least one of the yaw angle, the pitch angle, and the roll angle, of the eyewear. In some embodiments, the attitude may be partially determined, for example by determining only one or two of the yaw angle, the pitch angle, and the roll angle. In addition to the attitude, a distance of the eyewear to the digital device may also be determined. The distance may be an average distance or may be selected from the range of a shortest distance to a longest distance, e.g., in the case of a yaw angle different from zero.

An exemplary eyewear 120 is shown in FIG. 1 with respect to a coordinate system 110 having an x-axis (x), a y-axis (y), and a z-axis (z). FIG. 1 also shows the roll direction with a roll angle, the yaw direction with a yaw angle, and the pitch direction with a pitch angle.

Roll motion is a rotational motion about the x-axis of the coordinate system. Roll of an eyewear is shown in FIG. 1 about the x-axis. For a user wearing the eyewear, the roll motion would be a rotation within the frontal plan. For example, when the user rolls his head so that his left ear gets closer to the left shoulder, he is performing a left roll motion. A roll angle of zero may be defined when the head is at a resting position with regard to roll, for example, each of the ears is equidistant from the same-side shoulder.

Yaw motion is a rotational motion about the y-axis of the coordinate system. Yaw of an eyewear is shown in FIG. 1 about the y-axis. For a user wearing the eyewear, the yaw motion would be a rotation within the transversal plan. For example, when the user rotates his head to the left, the yaw angle is increased, and when the rotation is to the right, the yaw angle is decreased. A roll angle of zero may be defined when the head is at a resting position with regard to yaw, for example, when the ears are parallel to the shoulders.

Pitch motion is a rotational motion about the z-axis of the coordinate system. Pitch of an eyewear is shown in FIG. 1 about the z-axis. For a user wearing the eyewear, the pitch motion would be a rotation within the sagittal plan. For example, when the user pitches his head upwards, the pitch angle is increased, and when the pitch is downwards, the pitch angle is decreased.

In some embodiments, a calibration of a reference takes place. For example, a reference eyewear attitude may be defined as reference, e.g., by taking the measurement of a spectacles at a desired reference attitude. In such reference, the yaw angle, pitch angle, and roll angle may each be defined as zero. An origin of the reference coordinate system may be assigned in relation to the eyewear, for example, at a point behind the eyewear, wherein behind means the side on which the lenses are facing the user. For a user wearing the spectacles, an exemplary reference coordinate system may be at about a center of the user's head. According to various embodiments, the attitude of the eyewear may be a relative attitude. Deviations from a reference determined by measurement may be sufficient for determining a desired relative attitude of the eyewear. Thus, an absolute reference coordinate system may not be required.

In some embodiments, a geodetic reference may be used. For example, the pitch angle of an eyewear substantially parallel to the horizontal may be defined as zero. For a user wearing the eyewear, the pitch angle of zero may mean that the head is looking at a parallel to the horizontal. Instead of an angle of zero, a predefined angle from a parallel to the horizontal may be used. The roll angle of an eyewear substantially parallel to the horizontal may be defined as zero. For a user wearing the eyewear, the roll angle of zero may mean that a line crossing the centre of the pupils is parallel to the horizontal. However, embodiments of the disclosure are not limited to a geodetic reference, for example, any attitude may be defined as reference, depending on the desired application.

Various embodiments may explain the relation between an attitude of the eyewear (one or more of Yaw, Roll, Pitch) and an attitude of a user's head (or more of Yaw_user, Roll_user, Pitch_user) wearing the eyewear. The relation may be an identity, or correction factors (Cy, Cr, Cp) may be used. For example Yaw_user=Cy*Yaw, Roll_user=Cr*Roll, Pitch_user=Cp*Pitch. In the case of identity, the respective correction factor is 1.

Explanation about how to determine the attitude of the eyewear are provided together with the non-limiting examples below.

Figure 2A:
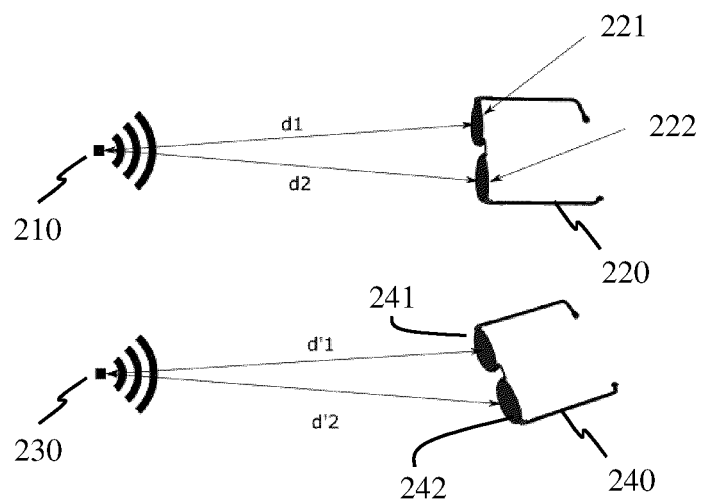
FIGS. 2A and 2B are schematic representation showing an example about how to determine the yaw angle of an eyewear with a digital device in accordance with various embodiments.

FIG. 2A is a schematic representation showing an example about how to determine the yaw angle of an eyewear with a digital device. The digital device may be configured to determine distances between the digital device (or a pre-determined location on the digital device) and each of a first lens and a second lens. The yaw angle may be determined with the determined distances. In the example of FIG. 2A, a digital device 210 includes a light sensor configured to determine the distance to each of the first lens 221 (d1) and the second lens 222 (d2) of a spectacle lens 220.

The first lens 221 and the second lens 222 may comprise different physical properties, which may be used to measure the distance. For example, the first lens 221 may include a first coating having a first reflectance in the first wavelength ($\lambda 1$), which first reflectance may be greater than 0.2, for example, greater than 0.8. The second lens 222 may include a second coating having a second reflectance in the second wavelength ($\lambda 2$), which second reflectance may be greater than 0.2, for example, greater than 0.8. The first coating's reflectance in the second wavelength may be smaller than the first reflectance, for example, the first coating's reflectance in the second wavelength may be less than 0.1, for example substantially zero. The second coating's reflectance in the first wavelength may be smaller than the second reflectance, for example, the second coating's reflectance in the first wavelength may be less than 0.1, for example substantially zero.

According to various embodiments, the light sensor may be configured to receive a light signal. The light signal may include a first light signal having the first wavelength and a second light signal light having the second wavelength different from the first wavelength. The light sensor may be further configured to detect light intensity of the first light signal and the second light signal independently from each other. For example, the light sensor may include a first photodetector able to detect the first light signal the first wavelength but not the second wavelength, and a second photodetector able to detect the second wavelength but not the first wavelength. In another example, the light sensor may include a first light source able to emit light with the first wavelength but not substantially in the second wavelength, and a second light source able to emit light with the second wavelength but not substantially in the first wavelength. Light with first and second wavelengths may also be emitted alternately. The light signal may thus include first light signal of the first wavelength and second light signal of the second wavelength alternated in time. In an example, a single photodetector may be used to detect both light signals at the respective times of each signal. Other means for determining distance may be implemented, which are able to independently determine the distances between the light sensor and the eyewear. For example, a time of flight light sensor may be used having a first selectivity for the first lens (e.g., the first wavelength) and a second selectivity for the second lens (e.g., the second wavelength). The light sensor may include or be the time of flight sensor.

In some embodiments, the yaw angle may be determined using a difference between the first distance and the second distance. In one example, the yaw angle may be determined as yaw angle=(arcsin((d2−d1)/PD) (Equation 1), wherein PD is a pre-determined constant, for example a pre-determined distance between a center of the first lens 221 and a center of the second lens 222, or the pre-determined pupillary distance associated with the spectacles.

In FIG. 2A, the digital device 210 includes a light sensor which determines the distance d1 between the light sensor and the first lens 221, and a distance d2 between the light sensor and the second lens 222. In an example, wherein d1=d2 (FIG. 2A, eyewear 222), by using the above formula, the yaw angle of zero degrees is obtained.

A variation of the above example is shown with a digital device 230 including a light sensor, which determines the distance d'1 between the light sensor and the first lens 241, and a distance d'2 between the light sensor and the second lens 242. In this example, d'2>d'1. By using the above formula (using d'1 instead of d1, d'2 instead of d2, and a pre-determined constant PD), a negative yaw angle is determined, indicating a left rotation. Alternatively, only the absolute yaw angle may be determined indicating a deviation from zero.

Figure 2B:
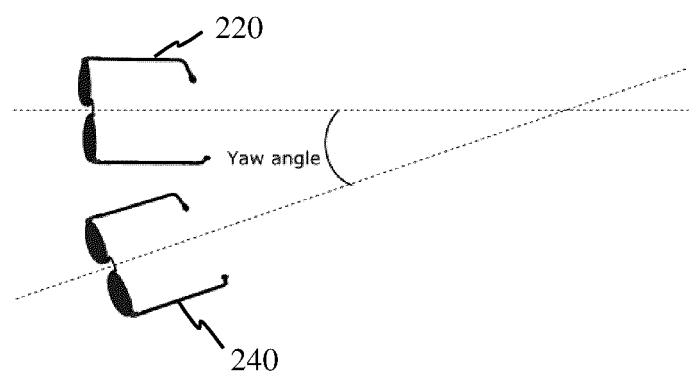

A schematic geometrical representation of the yaw between the spectacles 220 and 240 and of the yaw angle between the spectacles 220 and 240 is shown in FIG. 2B. While, in FIG. 2A-2B spectacles 220, 240 are shown by means of example, the present disclosure is not limited thereto. While a difference in reflectance is described with the two lenses of the eyewears of FIGS. 2A and 2B, the present disclosure is not limited thereto, for example, the difference in reflectance may be provided at any portion of the eyewear, for example, on two portions of a single lens, wherein PD is a distance of centers of these two portions. According to various embodiments, different reflectance spectra and different reflectances may be provided by different coatings, which coatings may be substantially transparent in the visible.

An exemplary method for determining the pitch angle is explained in connection with FIGS. 3A and 3B.

Figure 3A:
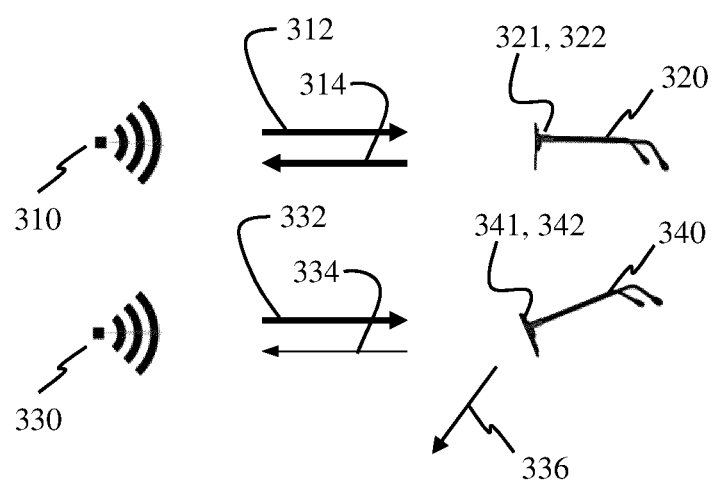
FIGS. 3A and 3B are schematic representation showing an example about how to determine the pitch angle of an eyewear with a digital device in accordance with various embodiments.
Figure 3B:
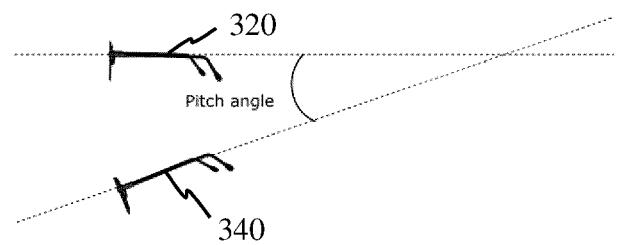

FIG. 3A is a schematic representation showing an example about how to determine the pitch of an eyewear with a digital device. The light sensor, and thereby the digital device e.g., when the light sensor is coupled or integrated into the digital device, may be configured to detect reflected light reflected by the eyewear and to measure the intensity of the reflected light. The digital device may be further configured to determine a deviation of the reflected light intensity from a pre-determined light intensity. The reflected light may include both of the first light signal and the second light signal. The reflected light may be light reflected by one or both of the first lens and the second lens, for example, upon incidence of light emitted by a light source included in the light sensor or otherwise in the digital device. The pitch angle may be determined with the deviation of the reflected light intensity from the pre-determined light intensity, for example using the formula pitch angle=arccos (i/i_max), wherein i is the measured intensity of the reflected light and i_max is the pre-determined light intensity. The pre-determined light intensity may be, for example, a light intensity measured during the calibration phase.

In the example of FIG. 3A, a digital device 310 includes a light sensor. In FIG. 3A, a spectacle 320 including first spectacle lens 321 and second spectacle lens 322 is used as example of an eyewear, however the embodiments of the disclosure are not limited thereto. Light 312 may be emitted from a light source (e.g. the first light source) of the digital device 310, for example, the light source may be integral to the light sensor. Light 312 may be reflected by one or both of the first and second spectacle lenses 321, 322 as reflected light 314. The intensity of the reflected light 314 may be measured by the light sensor. When the eyewear 320 has a pitch angle of zero in relation to the digital device 310 (as shown in FIG. 3A), the reflected light 314 is a maximum (i_max).

A variation of the preceding example is shown with a digital device 330 and eyewear 340. In this variation, the digital device 330 emits light 332 which may be reflected by the eyewear 340 as reflected light 334. Since the eyewear 340 has a pitch angle different from zero in relation to the digital device 330, part of the light 332 is reflected as light 336, which is not received by the light sensor. Therefore, the light sensor only receives reflected light 334, which is of lower intensity as the maximum (i_max).

The maximum intensity i_max may be determined in the calibration phase. For example, the reflected light may be measured at a pitch angle of zero at different distances. The different distances may be pre-determined distances, user selected distances which are input into the digital device, measured distances (for example using a time of flight sensor), or combinations thereof. The calibration data may be post-processed, for example, by interpolation, extrapolation, fitting, or combinations thereof.

A schematic geometrical representation of the pitch between the spectacles 320 and 340 and of the pitch angle between the spectacles 320 and 340 is described in connection with FIG. 3B. While, in FIG. 3A-3B spectacles 320, 340 are shown by means of example, the present disclosure is not limited thereto. While difference in reflectance is shown with one or two lenses in FIG. 3A, the present disclosure is not limited thereto, for example, the difference in reflectance may be provided at any portion of the eyewear, for example, on two portions of a single lens, wherein PD is a distance of centers of these two portions. Although different reflectances may be provided by different coatings, which coatings may be substantially transparent in the visible.

Figure 4A:
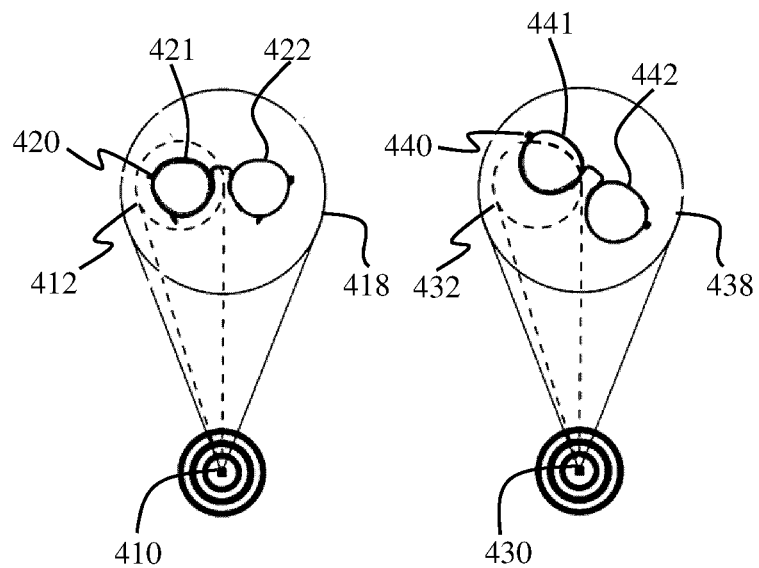
FIGS. 4A and 4B are schematic representation showing an example about how to determine the roll angle of an eyewear with a digital device in accordance with various embodiments.

FIG. 4A is a schematic representation showing an example about how to determine the roll of an eyewear with a digital device. The digital device may be configured to determine the roll of an eyewear, for example of a spectacle. In the example of FIG. 4A, the light sensor, and thereby the digital device e.g., when the light sensor is coupled or integrated into the digital device, may be configured to detect a reflected light which is light reflected by the eyewear and to measure the intensity of the reflected light. The reflected light may include a first light signal and a second light signal different from each other so that they may be discriminated, e.g. measured independently. The reflected light may be light emitted by a light source and reflected by the eyewear. The light source may be included in the digital device, for example the light source may be integral to the light sensor. The light emitted by the light source may include a first emitted light signal which emits with a first emission cone (e.g., having a first solid angle) and a second emitted light which emits with a second emission cone (e.g., having a second solid angle). The first emission cone may be smaller than the second emission cone, for example, covering only one quarter or less of the area of the second emission cone, wherein the areas are planar projections. The first and second emission cones may overlap in space, for example, the first emission cone may be completely in the space of the second emission cone.

The first lens 421 and the second lens 422 may comprise different physical properties, which may be used to measure the reflectance. For example, the first lens 421 may include a first coating having a first reflectance in the first wavelength ($\lambda 1$), which second reflectance may be greater than 0.2, for example, greater than 0.8. The second lens 422 may include a second coating having a second reflectance in the second wavelength ($\lambda 2$), which first reflectance may be greater than 0.2, for example, greater than 0.8. The first coating's reflectance in the second wavelength may be much smaller than the first reflectance, for example, the first coating's reflectance in the second wavelength may be less than 0.1, for example substantially zero. The second coating's reflectance in the first wavelength may be much smaller than the second reflectance, for example, the second coating's reflectance in the first wavelength may be less than 0.1, for example substantially zero.

According to various embodiments, the light sensor may be configured to receive the light signal. The light signal may include the first light signal having the first wavelength and a second light signal light having the second wavelength which is different from the first wavelength. The light sensor may be further configured to detect light intensity of the first light signal and of the second light signal independently from each other. For example, the light sensor may include a first photodetector able to detect the first light signal the first wavelength but not the second wavelength, and a second photodetector able to detect the second wavelength but not the first wavelength. In another example, the light sensor may include a first light source able to emit light with the first wavelength but not substantially in the second wavelength, and a second light source able to emit light with the second wavelength but not substantially in the first wavelength. Light with first and second wavelengths may also be emitted alternately. The light signal may thus include first light signal of the first wavelength and second light signal of the second wavelength alternated in time. In an example, a single photodetector may be used to detect both light signals at the respective times of each signal. Other means for determining light intensity may be implemented, which are able to independently determine the light intensities of the first light signal and of the second light signal.

In some embodiments, the roll angle may be determined using a difference between the intensity of the first light signal and of the intensity of the second light signal. In one example, the roll angle may be determined using a transfer function. According to some embodiments, it may be sufficient to determine whether the roll angle is within a pre-determined range or not. Based on posture studies, it was found that the roll angle of a head using a digital device is often close to zero degrees. Thus, the roll angle of an eyewear worn by a user would often be close to zero degrees (as shown with eyewear 420). In some embodiments, it may be sufficient to determine the yaw angle and the pitch angle as attitude of the eyewear, without measuring the roll angle.

A variation of the above example of FIG. 4A is shown with a digital device 430 and eyewear 440. (also in FIG. 4A) In this variation, the digital device 430 emits light 432 and 438 with two different cones identical as the previous example. The light 432 and 438 may be reflected by the eyewear 440. Since the eyewear 440 has a roll angle different from zero in relation to the digital device 430, the ratio of the intensity of the first light signal 432 (reflected by lens 441) to the second light intensity (reflected by both lenses 441, 442) is smaller than in the previous example (where the roll is zero).

Figure 4B:
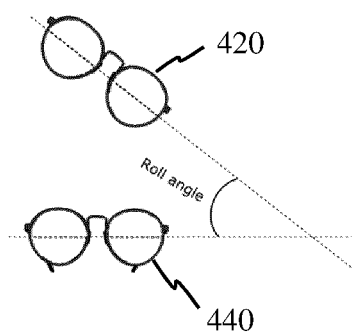

A schematic geometrical representation of the roll between the spectacles 420 and 440 and of the roll angle between the spectacles 420 and 440 is shown in FIG. 4B. While, in FIG. 4A-2B spectacles 420, 440 are shown by means of example, the present disclosure is not limited thereto. While a difference in reflectance is described with the two lenses of each eyewear of FIGS. 4A-4B, the present disclosure is not limited thereto, for example, the difference in reflectance may be provided at any portion of the eyewear, for example, on two portions of a single lens. According to various embodiments, different reflectances may be provided by different coatings, which coatings may be substantially transparent in the visible.

Figure 5A:
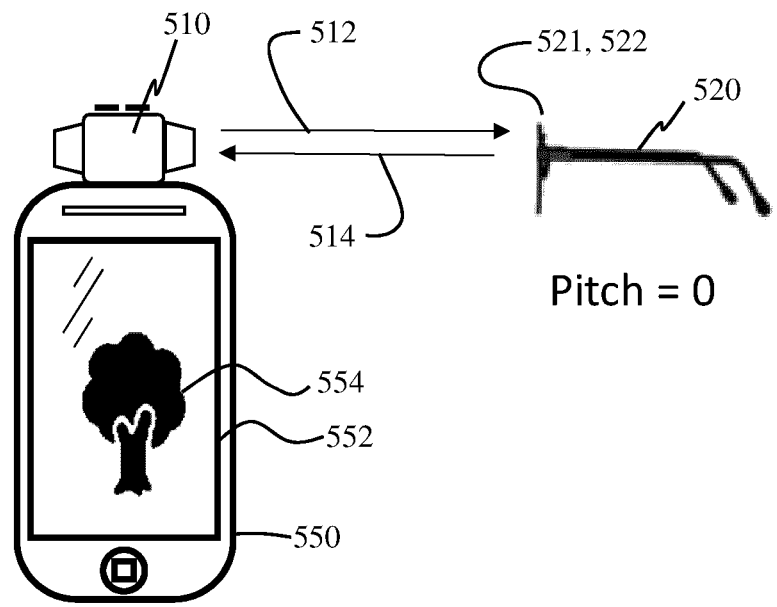
FIGS. 5A and 5B show the status of a display of a digital device 550 for two different pitch angles of an eyewear 520 in accordance with various embodiments.
Figure 5B:
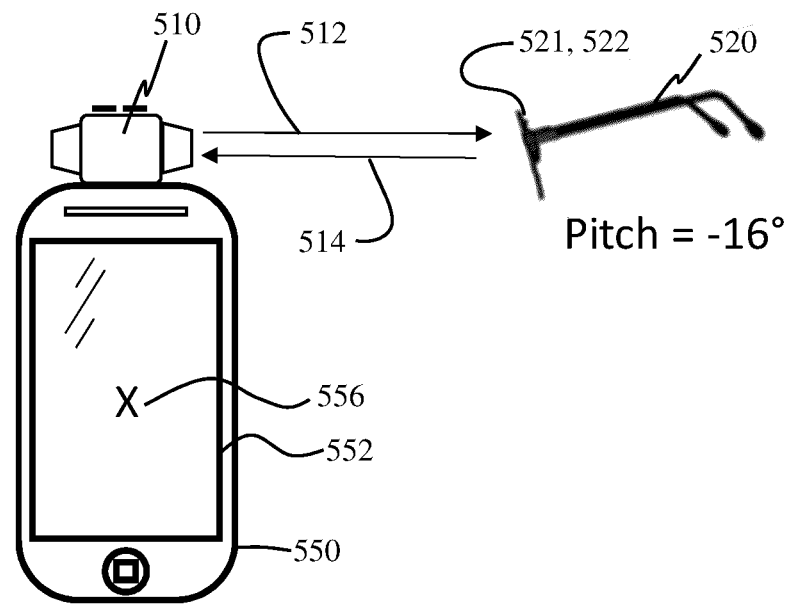

FIGS. 5A and 5B show a digital device 550 including an external sensor unit 510 coupled to the digital device 550, however the sensor unit may also be internal, e.g. integral to the digital device. The sensor unit 510 includes the light sensor. The light sensor is configured to determine the pitch angle of the eyewear 520. For illustration purposes, the eyewear 520 is a spectacle including first and second lenses 521 and 522. The first and second lenses 521 and 522 may be configured to reflect light emitted by the sensor in the form of a light signal. The sensor may be configured to receive the light signal and calculate, using the light signal, the pitch angle, as described in accordance with various embodiments.

In the examples of FIGS. 5A and 5B the pitch angle is shown in relation to digital device. However, a reference attitude other than the digital device may also be used in various embodiments.

For example, an acceptable pitch angle could be within +/−39 degrees (endpoints included), such as within +/−37 degrees (endpoints included). In FIG. 5A the pitch angle of the eyewear is zero, therefore within the exemplary pre-determined pitch angle range of +/−39 degrees. A display 552 of the digital device 550 shows an image 554, when the pitch angle is within the pre-determined pitch angle range. When the eyewear 520 is not within the pre-determined pitch angle range, for example, when the eyewear 520 has a pitch angle of −16 degrees as shown in FIG. 5B, the displayed image on display 552 changes, for example to blank or a symbol or message informing that the eyewear's 520 attitude is outside of the pre-determined range. Once the eyewear 520 returns to a pitch angle within the pre-determined pitch angle range the display 552 may return to a normal mode in which it shows the desired image (e.g. image 554). Image 554 may represent the normal mode in which the digital device has its intended (i.e. normal) operation. Similarly, a roll angle maybe defined as acceptable if within a certain range, for example within +/−6 degrees (endpoints included).

Determination of the attitude of an eyewear may be used to infer the posture of a user wearing the eyewear. For example, one or more of yaw angle, pitch angle, and roll angle may be measured. If one of the measured angles is out of a pre-determined range, the user may receive a feedback to correct his posture.

In addition to measurement of attitude, the digital device may be configured to measure a distance between the digital device and the eyewear. For example, the light sensor may be configured to measure a distance between the digital device 650 and the eyewear 620 as illustrated by way of example, in FIGS. 6A and 6B.

Figure 6A:
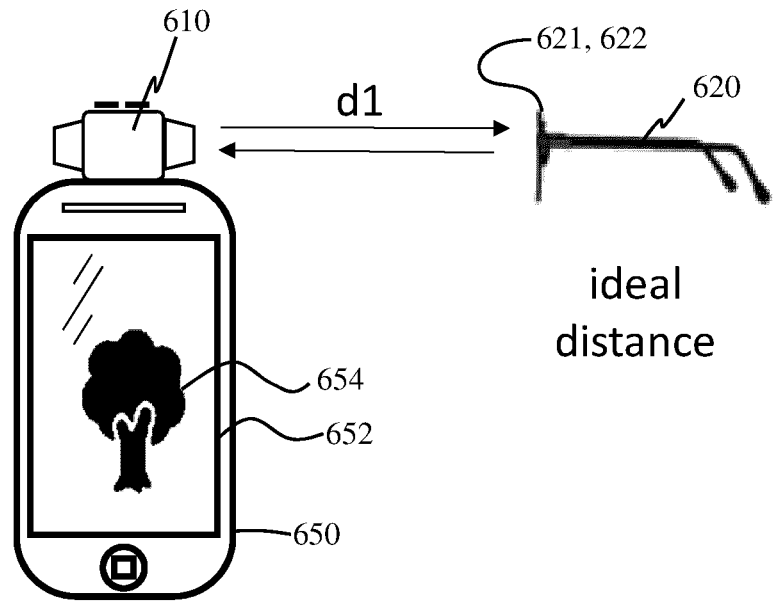
FIGS. 6A and 6B show the status of a display of a digital device 650 for two different distances of an eyewear 620 in accordance with various embodiments.
Figure 6B:
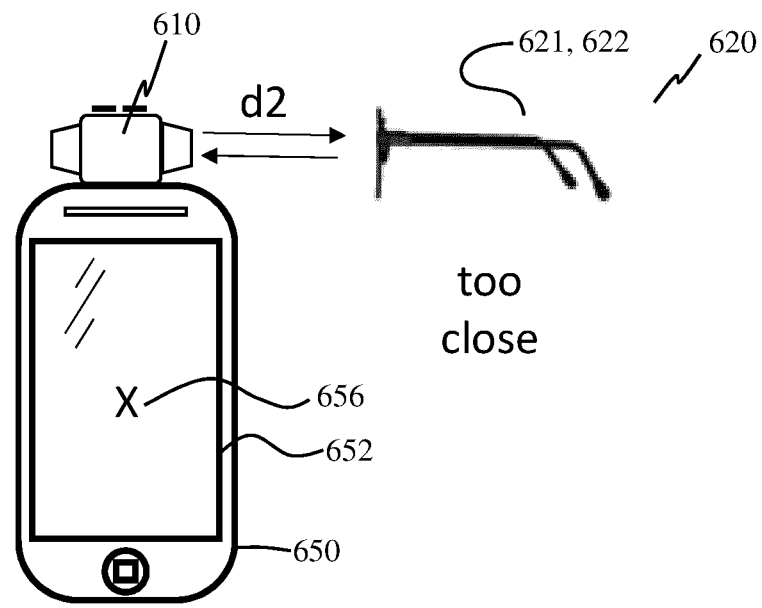

FIGS. 6A and 6B show a digital device 650 including an external sensor unit 610 coupled to the digital device 650, however the sensor unit may also be internal, e.g. integral to the digital device. The sensor unit 610 includes the light sensor. The light sensor is configured to determine a distance of the light sensor to the eyewear 620. For illustration purposes, the eyewear 620 is a spectacle including first and second lenses 621 and 622. The first and second lenses 621 and 622 may be configured to reflect light emitted by the sensor in the form of a light signal. The sensor may be configured to receive the light signal and determine the distance, as described in accordance with various embodiments. Distance may also be determined by other means than the light sensor.

For example, an acceptable distance may be $d_1$. In FIG. 6A the distance of the eyewear is $d_1$, and within an exemplary pre-determined distance range of greater or equal to $d_1$. A display 652 of the digital device 650 shows an image 654, when the distance is within the pre-determined distance range. When the eyewear 620 is not within the pre-determined distance range, for example, when the eyewear 620 has a distance of $d_2 < d_1$ as shown in FIG. 6B, the displayed image on display 652 changes, for example to blank or a symbol or message informing that the eyewear's 620 distance is outside of the pre-determined range. Once the eyewear 620 returns to a distance within the pre-determined distance range the display 652 may return to a mode in which it shows the desired image (e.g. image 654). Image 654 may represent the normal mode in which the digital device has its intended (i.e. normal) operation.

According to various embodiments, the light signal may include a first signal of the first wavelength and a second signal of the second wavelength different from the first wavelength, and wherein the light sensor is configured to detect the first light signal and the second light signal. According to various embodiments, the eyewear is configured to reflect light of the first wavelength and of the second wavelength, as will be illustrated by way of example, in connection with FIGS. 7 to 9. According to various embodiments, the eyewear may include a first coating on a first location and a second coating on a second location, which coatings may be different from each other. The first signal may be reflected by the first coating, and the second signal may be reflected by the second coating. The first location and the second location may be on a same lens (e.g., a single contact lens or a single spectacle lens), on different lenses (e.g., on left and right contact lenses, or on left and right spectacle lenses), on a non-lens portion (e.g., a spectacle's frame).

Figure 7:
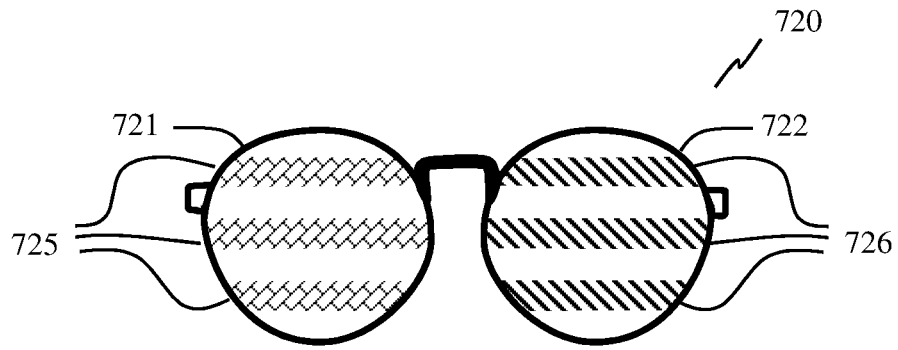
FIGS. 7, 8, and 9 show different coating patterns for eyewear in accordance with various embodiments.

FIG. 7 shows a spectacle 720, as an exemplary eyewear, including a first lens 721 and a second lens 722. The first lens 721 includes a first coating 725, for example, having reflection in the non-visible range of wavelengths, which may include a peak reflection at or within +/−20 nm of the first wavelength $\lambda 1$. The first coating 725 may form a pattern, for example of parallel stripes as shown in FIG. 7. The second lens 722 includes a second coating 726, for example, having reflection in the non-visible range of wavelengths, which may have a peak reflection at or within +/−20 nm of the second wavelength 2, wherein $\lambda 1$ is different from $\lambda 2$. The second coating 726 may form a pattern, for example of parallel stripes as shown in FIG. 7. The first coating 725 and the second coating 726 may have different reflectance properties. The first coating 725 and the second coating 726 may be homogeneously, or in have a pattern, as shown in the figure in form of stripes. A pattern may further be used to detect orientation of a pattern feature (e.g., the elongation direction of the stripes) in relation to a sensor (e.g., a near-infrared camera).

Figure 8:
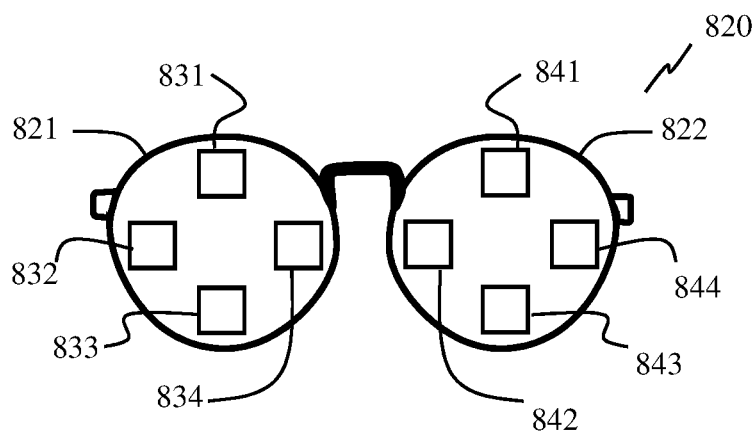

FIG. 8 shows a spectacle 820, as an exemplary eyewear, including a first lens 821 and a second lens 822. The first lens 821 includes a first coating 831, for example, having reflection in the non-visible range of wavelengths, which may include a peak reflection at or within +/−20 nm of the first wavelength $\lambda 1$. The first coating 831 may have a pattern, for example, square (as shown in FIG. 8), polygon with more than 4 sides, circle, ellipse, or other suitable shape. The first lens 821 may include a second coating 832, and may further include a third coating 833 and/or a fourth coating 834. Each of the first, second, third, and fourth coating may be different from each other, for example, may have a different reflectance from each other. The second lens 822 may include the same coatings as the first lens 821, for example in a same arrangement, in a mirrored arrangement, in a rotated arrangement, in a translated arrangement, or a combination thereof. For example, coating 841 may have a same reflectance as first coating 831, coating 842 may have a same reflectance as second coating 832, coating 843 may have a same reflectance as third coating 823, and coating 844 may have a same reflectance as fourth coating 824.

Figure 9:
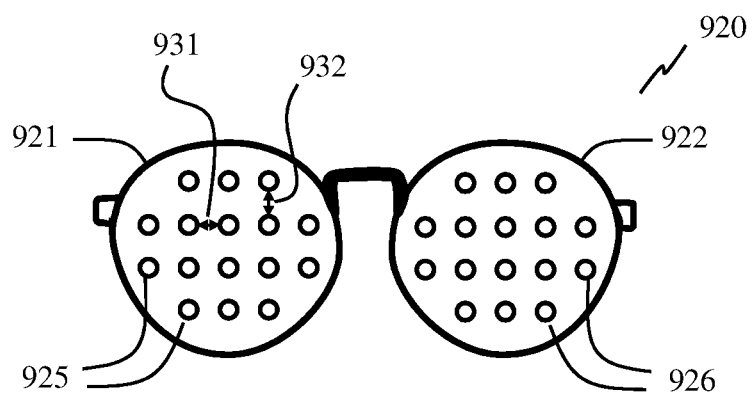

FIG. 9 shows a spectacle 920, as an exemplary eyewear, including a first lens 921 and a second lens 922. The first lens 921 and/or the second lens 922 may include a coating 925, 926, for example, having reflection in the non-visible range of wavelengths. The coating 925, 926 may be in the form of a pattern, for example of spaced coated portions, such as circles (as shown in FIG. 9), polygons with more than 4 sides, squares, ellipses, or other suitable shapes. The coating 925, 926 may be present on the first lens 921 as first coating 925, on the second lens 922 as second coating 926 or on both lenses. The pattern may be, for example, an arrangement of the coated portions in rows and columns, for example rows substantially perpendicular to columns as illustrated in FIG. 9. The pattern may be used to detect orientation of a pattern feature (e.g., a row or a column) in relation to a sensor (e.g., a near-infrared camera).

According to various embodiments, the pattern may be free of any rotational symmetry of order greater than 8, for example the pattern may be free of any rotational symmetry of order greater than 4. A rotational symmetry of 4 or lower may allow for easier detection of roll angle, since the rotation symmetric angles are larger (e.g. 90 degrees for a rotational symmetry of 4).

While some embodiments and examples of the present disclosure are explained in connection with spectacle, a spectacle is used for illustration purposes, and the disclosure is not limited thereto. For example, the eyewear may be a spectacle, a sunglass, a head mounted device, an augmented reality device, a virtual reality device, a contact lens, a pair of contact lenses, or another suitable eyewear. The eyewear may have one lens, two lenses or more lenses.

According to various embodiments, the pre-determined distance between the first location and the second location may be used for calculating the attitude of the eyewear, for example as PD in Equation 1. The pre-determined distance may be the distance between a center of the first location and a center of the second location. The pre-determined distance is greater than zero.

According to some embodiments, detecting a light signal may include capturing an image of a pattern of the eyewear. For example the light sensor may be or include a camera, such as an infrared camera. Calculating the attitude of the eyewear may include determining a deviation between the captured image and a pre-determined pattern, for example with a pattern matching algorithm; and using the deviation to calculate the attitude. According to some embodiments the attitude may include the roll angle, wherein determining the deviation may include identifying an orientation of the pattern; and wherein calculating the roll angle may include calculating the angular difference of the orientation using the pre-determined pattern as reference. In one example, the pattern matching algorithm may stepwise rotate the captured image of the pattern of the eyewear in relation to a pre-determined expected pattern and perform matching, the angle corresponding to a best matching may be considered the roll angle. The matching may be scale invariant. Instead of rotating the captured image, the algorithm may rotate the pre-determined expected pattern.

According to some embodiments, determining the deviation may include identifying a first dimension and a second dimension of the pattern, wherein the first dimension (or an extension thereof) and the second dimension (or an extension thereof) intersect, and wherein the attitude may include one or both of the pitch angle and the yaw angle, and calculating one or both of the pitch angle and the yaw angle may include calculating the difference of the first dimension and/or the second dimension from the pre-determined pattern. The attitude calculation may further include using a measured distance between the light sensor and the eyewear. Using, for illustration purposes, the eyewear of FIG. 9, the first dimension may be a column distance 931, and the second dimension may be a row distance 932. A measured row distance 932 smaller than a reference expected row distance (for a given distance between the light sensor and the eyewear) indicates a yaw, and the measured row distance 932 may be used to calculate the yaw angle. A measured column distance 931 smaller than a reference expected column distance (for a given distance between the light sensor and the eyewear) indicates a pitch, and the measured column distance 931 may be used to calculate the pitch angle.

According to various embodiments, the light sensor may be selected or include from at least one of: an infrared camera, an infrared time-of-flight sensor, a non-imaging sensor, or a combination thereof. The non-imaging sensor may be a non-imaging infrared sensor, for example a non-imaging infrared photodiode, or a non-imaging infrared time-of-flight sensor.

Various embodiments relate to a computer program product including instructions which, when the program is executed by a computer, causes the computer to carry out the method as explained herein in according to various embodiments. In some embodiments, the computer may be include in the digital device or the computer may be the digital device. According to various embodiments, the instructions may further include determining a difference between the attitude and a pre-determined attitude reference. The instructions may further include initiating a user alert when the difference is larger than a pre-determined threshold. For example, the user alert may be in the form of a sound, or a change of an information shown on a display. The computer program product may be executed on the computer, or on a distributed system comprising at least one microprocessor. In an example, the instructions may be to change the brightness, issue a written notification, or turn off a display of the digital device when the eyewear's attitude to the light sensor changes from greater than a pre-determined attitude range to smaller than the pre-determined attitude range. Similarly, the instruction may be reverted (e.g. revert the brightness, delete the written notification, or turn on the display), when the eyewear's attitude to the light sensor changes back to greater than a pre-determined attitude range.

Figure 10:
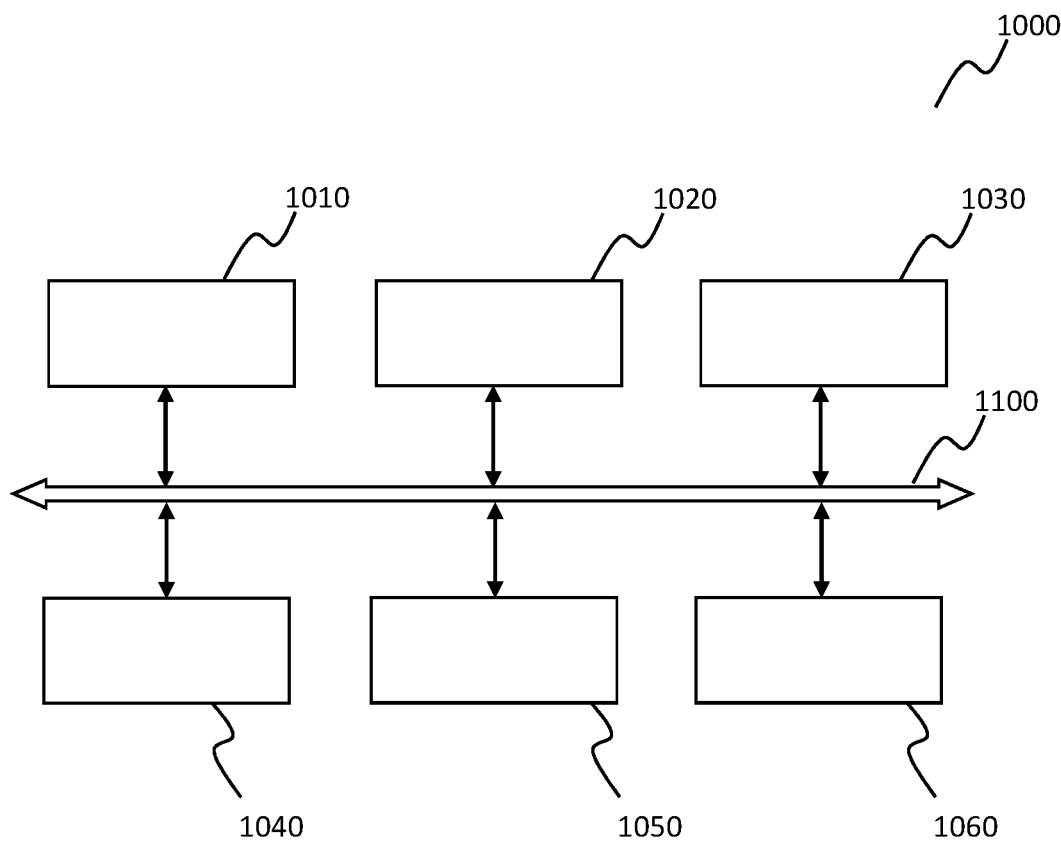
FIG. 10 shows the device architecture of an exemplary digital device 1000, which may be used in accordance with various embodiments.

FIG. 10 shows the architecture of an exemplary computer 1000, which may be used in accordance with various embodiments. The computer 1000 includes a bus 1100 through which one or more of the devices may communicate with each other. In the example of FIG. 10, the following devices are shown connected to the bus 1000: a CPU 1010; a main memory 1020, for example a RAM; a storage device 1030, for example a hard disk drive, a solid state drive, a flash drive; a communication device 1040, for example for wired or wireless communication, e.g. WiFi, USB, Bluetooth; a display interface 1050, and other user interfaces 1060, for example for user input; however the disclosure is not limited thereto, and more or less devices may be included in the computer and the computer and/or bus may have other architectures than the one illustrated.

Various embodiments relate to a method for determining an attitude of an eyewear. In some embodiments, the eyewear is not worn by a user. In addition to the method for determining an attitude of an eyewear, the present disclosure also concerns a method of treatment of a user's posture including detecting a light signal with a digital device comprising a light sensor for a non-visible wavelength range, calculating, using the light signal, an attitude of the eyewear, wherein the light signal is signal reflected from the eyewear when the eyewear is within a sensor range and being worn by a user, and wherein the attitude is at least one of: a yaw angle, a pitch angle, a roll angle. Posture correction advice may be provided to the user in the case that it is determined that the user's posture is out of a pre-determined optimal range. The posture correction advice may be provided by a display of the digital device. According to various embodiments, the user posture may include or substantially be attitude of the head in relation to the neck.

According to various embodiments, the eyewear may include an optical substrate and an interferential coating. The optical substrate may have a front main face and a rear main face on opposite sides, wherein the front main face is for facing the user when the user is wearing the eyewear.

According to various embodiments, a coating having reflection in the non-visible range of wavelengths, as used in various embodiments (e.g. first coating, second coating) may be an interferential coating. The interferential coating may be disposed on at least one of the front main face and rear main face and may be configured to selectively reflect light of at least one range of wavelengths of an incident light in the near infrared light spectrum. A peak reflectance measured at a substantially normal to the eyewear may be at least 70%.

According to various embodiments, the interferential coating may have a mean reflectance of less than 5% in a visible light range.

According to various embodiments, the interferential coating may include at least two low refractive index layers and at least two high refractive index layers, wherein the low refractive index layers and the high refractive index layers are in an alternating sequence, for example as a stack of layers. The low refractive index layers may be layers of low refractive index material. The high refractive index layers may be layers of high refractive index material. The low refractive index layers may have a refractive index lower than the high refractive index layers. Each of the low refractive index layers may have a refractive index lower than 1.60 and each of the high refractive index layers may have a refractive index higher than 1.80.

According to various embodiments, the stack of layers may be, for example, a quarter wavelength stack also named herein as quarter wave interferential coating, or an anti-reflection (AR) stack also named herein as anti-reflection interferential coating. Anti-reflection may mean reducing reflection in at least a portion of the visible spectrum, for example in the whole visible spectrum. The stacks are optimized for enhanced reflection in the near infrared.

According to various embodiments, the ratio of a highest refractive index amongst the high refractive index layers to a lowest refractive index amongst the low refractive index layers may be greater than 1.30, for example greater than 1.40.

According to various embodiments, the low refractive index layers may have a low refractive index material composition of a first refractive index and a first thickness, and the high refractive index layers may have a high refractive index material composition of a second refractive index different from the first refractive index and a second thickness different from the first thickness.

According to various embodiments, the interferential coating may include low refractive index layers and high refractive index layers in an alternating sequence. The optical thickness of each layer of the low refractive index layers may be equal to a quarter of a targeted center reflection wavelength. The optical thickness of each layer of the high refractive index layers may equal to a quarter of a targeted center reflection wavelength. The interferential coating may include an outer high refractive index layer, which is furthest from the optical substrate amongst the high refractive index layers. The interferential coating may further include an outer low refractive index layer which is disposed on the outer high refractive index layer on a side which is distal from the optical substrate. The outer low refractive index layer may have an optical thickness equal to one-eighth of the targeted wavelength.

According to various embodiments, the multilayered interferential coating may include at least 8 layers.

According to various embodiments, a reflectance of the interferential coating at 850 nm and/or a reflectance of the interferential coating at 940 nm is at least 70%, for example at least 80%. According to various embodiments, the peak reflectance of the optical filter is at 850 nm+/−10 nm or at 940 nm+/−10 nm. According to various embodiments, a first coating, for example on a first lens or a first portion of a first lens, may have a peak reflection at or within +/−20 nm of the first wavelength λ1, for example at 850+/−10 nm. A second coating, for example on a second lens or a second portion of the first lens, may have a peak reflection at or within +/−20 nm of the second wavelength λ2, for example at 940+/−10 nm.

According to various embodiments, the optical filter may have a reflectance value (Rv) equal or lower than 2%, for example equal or lower than 0.5%, for example equal or lower than 0.1%. According to various embodiments, the eyewear may have an Rv equal or lower than 2%, for example equal or lower than 0.5%, for example equal or lower than 0.1%.

According to various embodiments, Rv is described and may be determined with the equation below, where R(λ) is the reflectance at wavelength of λ, V(λ) is the eye sensitivity function in CIE 1931, and D65(λ) is the daylight illuminant defined in standard CIE S005/E-1998.

$$Rv = \frac{\int_{380}^{780} R(\lambda) \cdot V(\lambda) \cdot D_{65}(\lambda) d\lambda}{\int_{380}^{780} V(\lambda) \cdot D_{65}(\lambda) d\lambda}$$

The interferential coating may be disposed on at least one of the front main face and rear main face and may be configured to selectively reflect light of at least one range of wavelengths of an incident light I1 in the near infrared light spectrum. A peak reflectance measured at a substantially normal to the eyewear may be at least 70%. The expression "substantially normal", as used herein and according to various embodiments, may mean within an angle of 15 degrees from the geometric normal to a surface on which light may be incident, e.g., surface 3 of the eyewear at the point where light I1 is incident.

According to various embodiments, the optical substrate may include, for example, be composed of: transparent materials, transparent mineral glass, transparent organic materials. An organic substrate may include, for example, be composed of: thermoset or thermoplastic materials, for example, commercially available material: Orma, 1.56, MR8, MR7, polycarbonate. Alternatively or in addition to transparent materials, the optical substrate may include, for example, be composed of, tinted materials, for example substrate for sunglasses. The term "transparent" may mean a peak transmittance of at least 85%, optionally at least 95%, in any or all concerned wavelengths, for example in the visible spectrum. In examples, the substrate thickness may be selected from the range of 0.3 mm to 5 mm.

According to various embodiments, the interferential coating may include at least two low refractive index layers and at least two high refractive index layers, wherein the low refractive index layers and the high refractive index layers are in an alternating sequence. The low refractive index layers may be layers of low refractive index material. The high refractive index layers may be layers of high refractive index material. The low refractive index layers may have a refractive index lower than the high refractive index layers.

Figure 11:
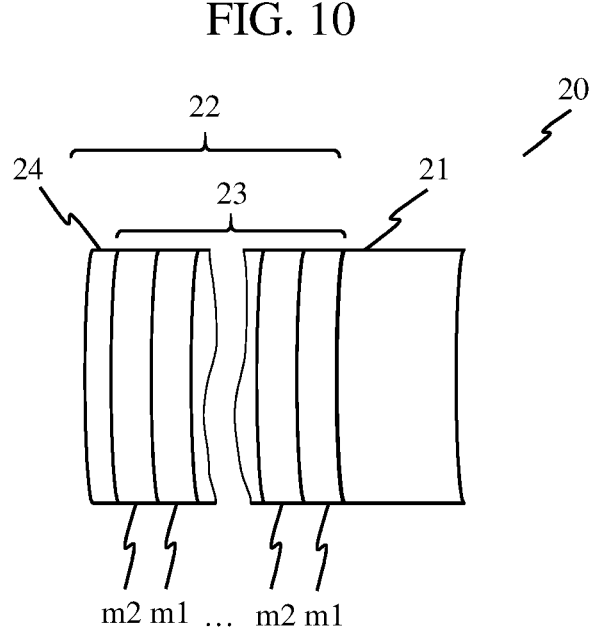
FIGS. 11 to 15 show several exemplary coatings which may be used for the eyewear in accordance with various embodiments.

An exemplary interferential coating 22 on an optical substrate 21 is schematically illustrated in FIG. 11. According to various embodiments, the interferential coating may include low refractive index layers m1 and high refractive index layers m2 in an alternating sequence forming a stack. The interferential coating 22 of FIG. 11 includes low refractive index layers m1 and high refractive index layers m2, which form a stack 23. Except for the first and last layers of the stack, each of the low refractive index layers m1 may be in contact with two high refractive index layers m2 and vice-versa. The optical thickness of each layer of the low refractive index layers m1 may equal to a quarter of a targeted center reflection wavelength. The optical thickness of each layer of the high refractive index layers m2 may equal to a quarter of a targeted center reflection wavelength. The interferential coating 22 may include an outer high refractive index layer, which is furthest from the optical substrate 21 amongst the high refractive index layers m2. The interferential coating 22 may further include an outer low refractive index layer 24, which is disposed on the outer high refractive index layer on a side which is distal from the optical substrate 21. The outer low refractive index layer 24 may have an optical thickness equal to one-eighth of the targeted wavelength. The outer low refractive index layer 24, may be configured to, for example, optically interface the stack 23 with air.

In some embodiments, the low refractive index layers may have a low refractive index material composition of a first refractive index and a first thickness, and the high refractive index layers may have a high refractive index material composition of a second refractive index different from the first refractive index and a second thickness different from the first thickness. For example, each of the low refractive index layers may have the low refractive index material composition of the first refractive index and may have the first thickness; each of the high refractive index layers may have the high refractive index material composition of the second refractive index and may have the second thickness.

Each of the low refractive index layers may have a refractive index lower than 1.60 and each of the high refractive index layers may have a refractive index higher than 1.80. Low refractive index layers may include or be formed of: $SiO_2$, $SiO_2$—$Al_2O_3$ composite with less than 20 mol % of $Al_2O_3$, $MgF_2$, and their mixtured. High refractive index layers may include or be formed of: SiN, $TiO_2$, $Nb_2O_5$, $ZrO_2$, $Ta_2O_5$, $Nd_2O_3$, $Pr_2O_3$, $PrTiO_3$, $La_2O_3$, and their mixtures. According to various embodiments, the refractive index of a material, if not otherwise defined, refers to the refractive index of the material in vacuum at the wavelength of 550 nm.

Figure 12:
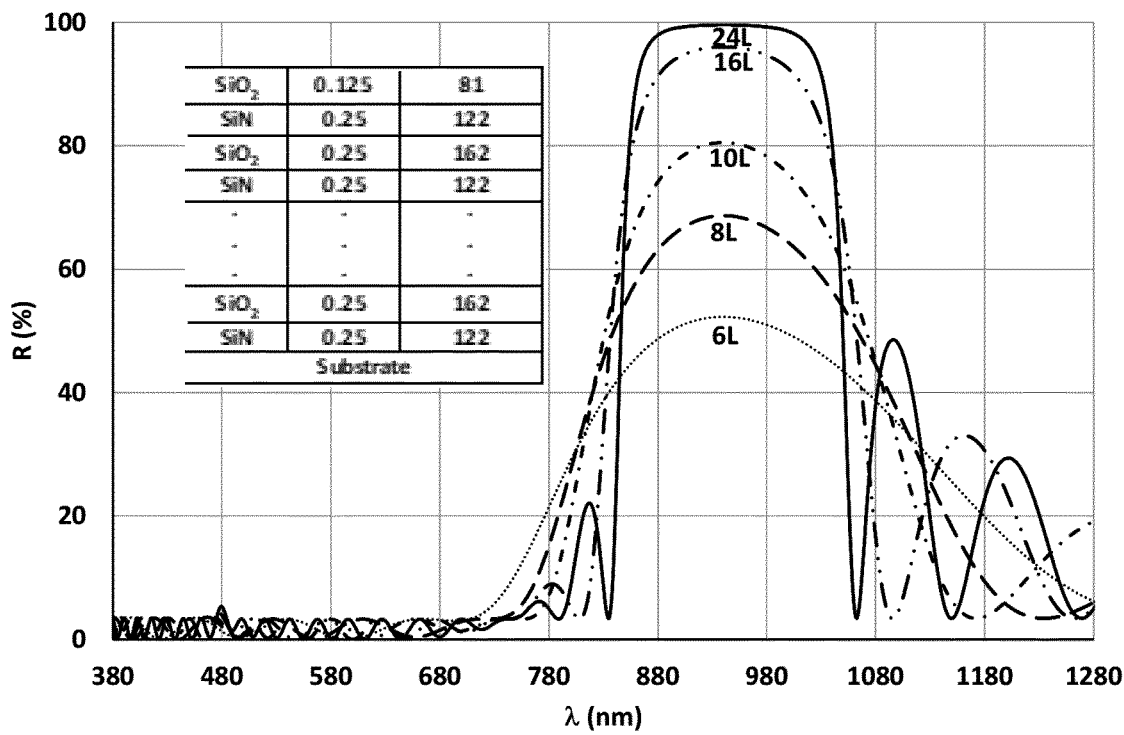

FIG. 12 shows a table with a layer configuration of an interferential coating optimized for 940 nm, the columns from left to right represent: material composition, optical thickness in wavelengths of 940 nm, and physical thickness in nanometers (nm). In FIG. 12, the interferential coating includes a stack of alternated $SiO_2$ as low refractive index layers and SiN layers as high refractive index layers. The optical thickness of each of the low refractive index layers and the high refractive index layers is 0.25. The physical thickness of each of the low refractive index layers is 162 nm, and the physical thickness of each of the high refractive index layers is 122 nm. The interferential coating further includes an outer low refractive index layer (first line of the table) of $SiO_2$ with optical thickness of 0.125 and physical thickness of 81 nm. FIG. 12 also shows reflectance plots as function of the wavelength for the interference coatings with a stack varying from 6 layers (6L), 8 layers, 10 layers, 16 layers, and 24 layers (24L). The number of layers increases from bottom up. As can be seen, with the exemplary configuration of FIG. 12, a stack of 10 or more layers provides a peak reflectance measured at a substantially normal to the eyewear is at least 70%.

Figure 13:
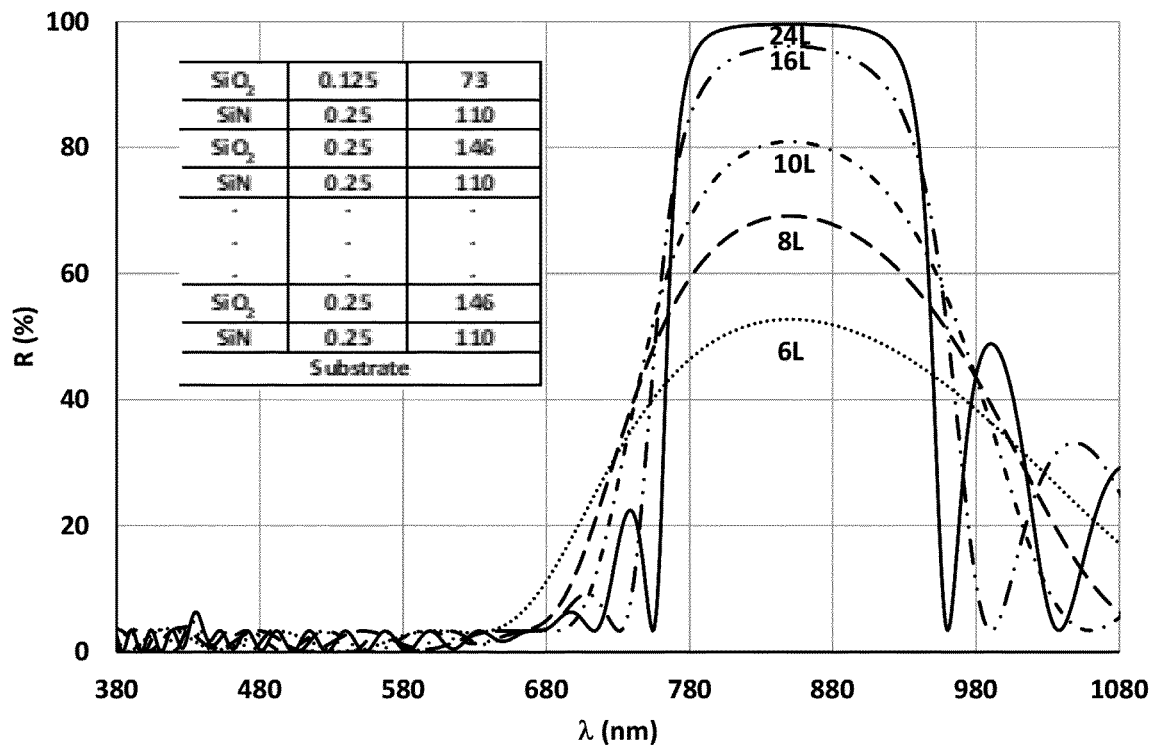

FIG. 13 shows another table with a layer configuration of an interferential coating optimized for 850 nm, the columns from left to right represent: material composition, optical thickness in wavelengths of 850 nm, and physical thickness in nanometers (nm). In FIG. 13, the interferential coating includes a stack of alternated $SiO_2$ as low refractive index layers and SiN layers as high refractive index layers. The optical thickness of each of the low refractive index layers and the high refractive index layers is 0.25. The physical thickness of each of the low refractive index layers is 110 nm, and the physical thickness of each of the high refractive index layers is 146 nm. The interferential coating further includes an outer low refractive index layer (first line of the table) of $SiO_2$ with optical thickness of 0.125 and physical thickness of 73 nm. FIG. 13 also shows reflectance plots as function of the wavelength for the interference coatings with a stack varying from 6 layers (6L), 8 layers, 10 layers, 16 layers, and 24 layers (24L). The number of layers increases from bottom up. As can be seen, with the exemplary configuration of FIG. 13, a stack of 10 or more layers provides a peak reflectance measured at a substantially normal to the eyewear is at least 70%.

FIGS. 12 and 13 show the structure and reflection spectra of $SiN/SiO_2$ quarter-wavelength reflection filters. It is noted that reflectance at 940 nm or 850 nm of these reflection filter increases gradually with increasing the number of layers of the stacks, while the mean reflectance in visible region changes little, with Rv remaining at around 2%. With about 24 layers (12 layers of SiN and 12 layers $SiO_2$), about 100% reflectance at 940 nm or 850 nm can be achieved. In examples, the first coating may be any of the coatings as shown in connection with FIG. 12 and the second coating may be any of the coatings as shown in connection with FIG. 13.

Figure 14:
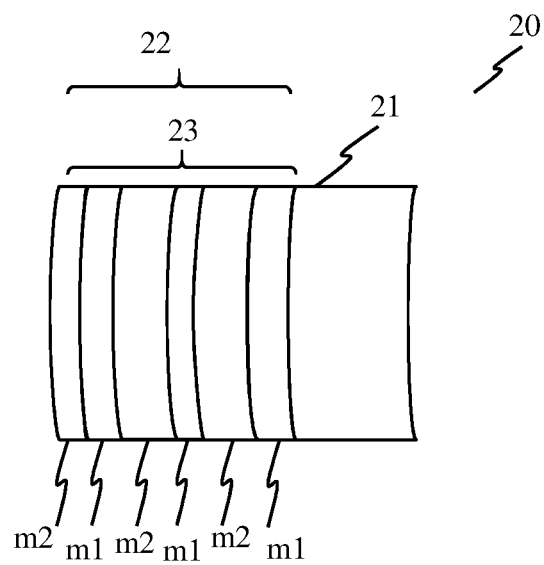

FIG. 14 shows an interferential coating 22 as described above, for example in connection with FIG. 11, with the exception that the low refractive index layers m1 may have different thicknesses from each other and the high refractive index layers m2 may have different thicknesses from each other. Furthermore, the low refractive index layers are not necessarily of a same material, and the high refractive index layers are not necessarily of a same material. The thicknesses of the layers may be determined, for example using a transfer matrix method. An example of the interferential coating 22 of FIG. 11 is an anti-reflection (AR) stack also named herein as anti-reflection interferential coating. In the example of FIG. 11, the interferential coating 22 is shown as including a stack 23 of 6 layers, however the disclosure is not limited thereto. With the optimized layer thicknesses, such a stack 23 is able to achieve the peak reflectance of at least 70% with less layers than the previous examples explained in connection with FIGS. 12 and 13.

According to various embodiments, the ratio of a highest refractive index amongst the high refractive index layers to a lowest refractive index amongst the low refractive index layers may be greater than 1.30, for example greater than 1.40.

For stacks consisting of two kind of materials the index ratio may be determined as the ratio of the refractive index of m2 over the refractive index of m1. Two kind or materials may mean all low refractive index material layers having a same material and all high refractive index material layers having a same material. For stacks consisting of three or more materials, the index ratio may be determined as of the highest index over the lowest index. For example, in an 8 layer AR stacks consisting of $SiO_2$, $ZrO_2$, and $TiO_2$ layers, the index ratio is determined as the ratio of the refractive index of $TiO_2$ over the refractive index of $SiO_2$.

Figure 15:
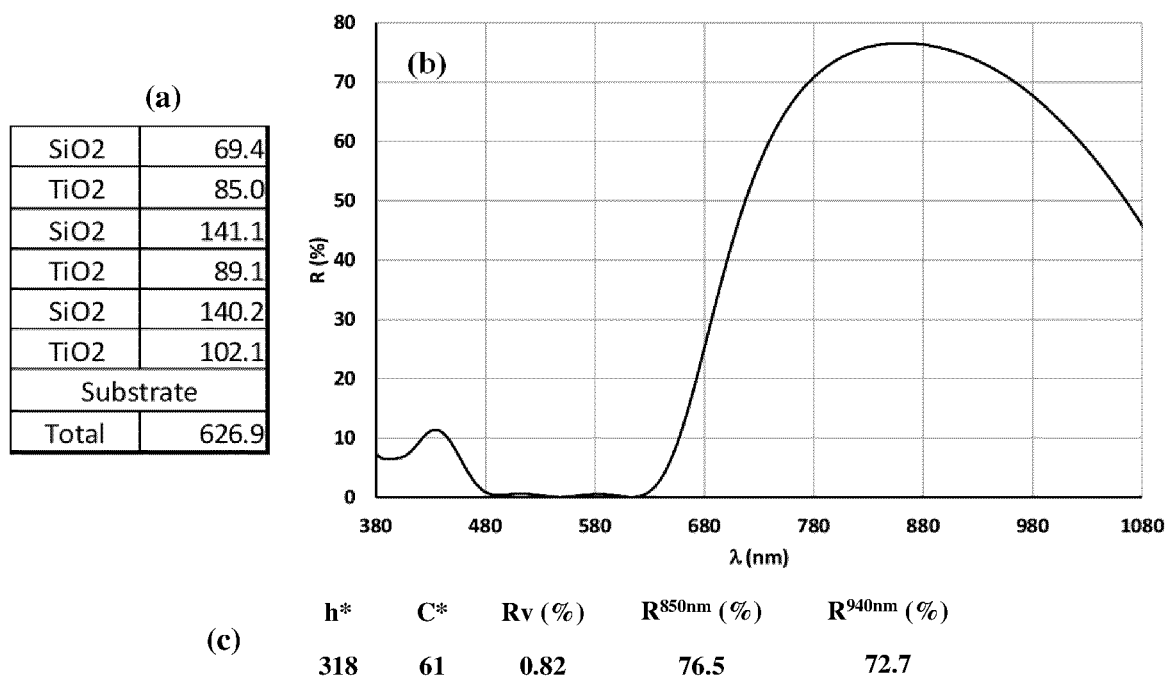

FIG. 15(a) shows a table with the material composition and layer thickness (in nm) of an interference coating in accordance with various embodiments. The interference coating comprises low refractive index layers of $SiO_2$ and high refractive index layers of $TiO_2$ alternately stacked on the substrate. The thicknesses of the layers is optimized for 850 nm. The reflectance spectrum of the interference coating is shown in FIG. 10(b), it can be seen that a peak reflectance measured at a substantially normal to the eyewear is greater than 70%. The table in FIG. 15(c) shows extracted parameters from the reflectance spectrum, in this case, the reflectance at 850 nm is 76.5% and at 940 nm is 72.7%. The reflectance is close to 0% (less than 5%) at a substantial portion of the visible spectrum.

While various embodiments describe determining angles, for example, the yaw angle, the pitch angle, or the roll angle, it is also envisaged to determine that there is a deviation of the angle, without necessarily determining an exact angle. Thus, in some embodiments, the respective angle may indicate a deviation but does not necessarily needs to indicate an exact angle.

An aspect of the disclosure concerns an eyewear including at least a first coating having reflection in the non-visible range of wavelengths, and further including a frame, e.g. for holding lens, the frame including the first coating. The frame may further include a second coating. The first coating and the second coating may have different reflectance spectra. Each of the first coating and the second coating may have regions of different reflectance spectra.

According to some embodiments, the eyewear may include a frame, such as a spectacle's frame. The frame of the eyewear may include a first coating on a first location and a second coating on a second location, which coatings may be different from each other. The first signal may be reflected by the first coating, and the second signal may be reflected by the second coating. The first location and the second location may be a non-lens portions on the frame. Each of the first and second coatings may include a pattern, for example, be patterned. The attitude of the eyewear may be determined by detecting the light signal from a non-electronic portion of the frame. The frame may be electronically passive (i.e., not electronically powered).

According to some embodiments, the eyewear may include a frame, such as a spectacle's frame. The frame of the eyewear may include a first coating on a first location and/or a second coating on a second location, which coatings may be different from each other. The first and/or second coatings may be in the form of a pattern, for example of spaced coated portions, such as circles, polygons with more than 4 sides, squares, ellipses, or other suitable shapes. The pattern may be, for example, an arrangement of the coated portions in rows and columns, for example rows substantially perpendicular to columns. The pattern may be used to detect orientation of a pattern feature (e.g., a row or a column) in relation to a sensor (e.g., a near-infrared camera). The attitude of the eyewear may be determined by detecting the light signal from a non-electronic portion of the frame. The frame may be electronically passive (i.e., not electronically powered).

Only a small amount of coating is required for the light sensor to register an adequate amount of light signal reflected by the first and/or second coatings. The first coating and/or the second coating may be substantially indistinguishable from the remaining of the frame, by a user. As such, it does not affect the aesthetic of the frame. The first coating and/or the second coating could be any material that is capable of reflecting NIR and can be integrated in the frame using several methods, such as coating, e.g., as previously defined.

Figure 16:
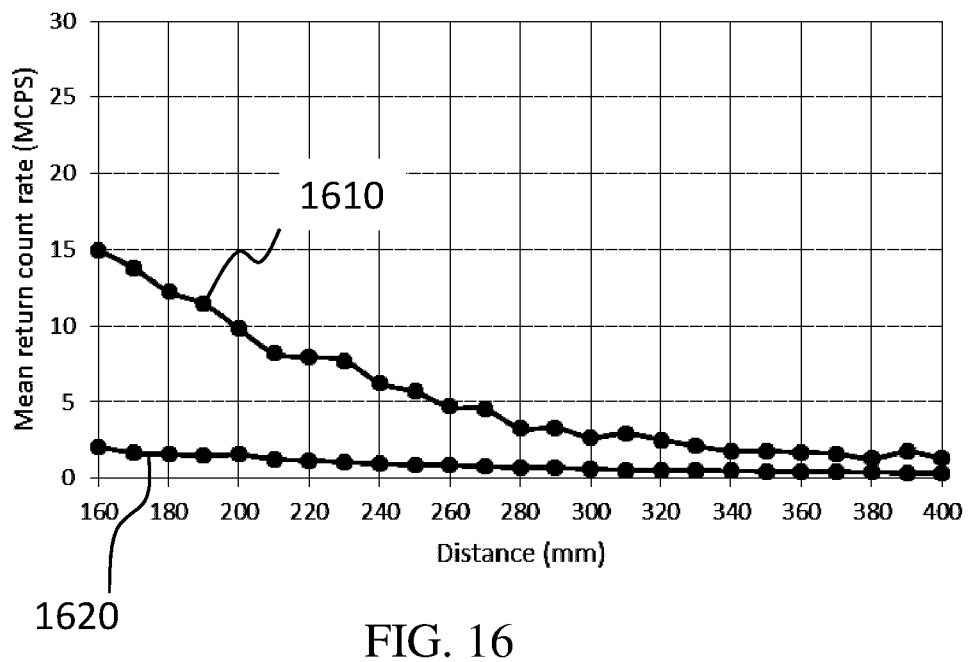
FIG. 16 shows a graph comparing the reflection level between the 2 test frames at various distances.

According to some embodiments, the first coating and/or the second coating may be a reflective film, for example a safety tape. The reflective film may be integrated in the spectacle frame, for example by adhesive. In an exemplary embodiment, the reflective film is taped to a spectacle frame and its performance is compared with a comparative frame which void of reflective film, but otherwise identical to the spectacle frame. The graph of FIG. 16 compares the reflection level between the 2 test frames at various distances from 160 mm to 400 mm using a light detector which returns counts per seconds. Clearly, the frame with the coating in accordance with embodiments, as shown by data points 1610, gives significantly higher reflection count, of 2 MCPS to 15 MCPS (MCPS=million counts per second), than the comparative example of data points 1620, which results only in 0.5 MCPS to 2MCPS.

Figure 17:
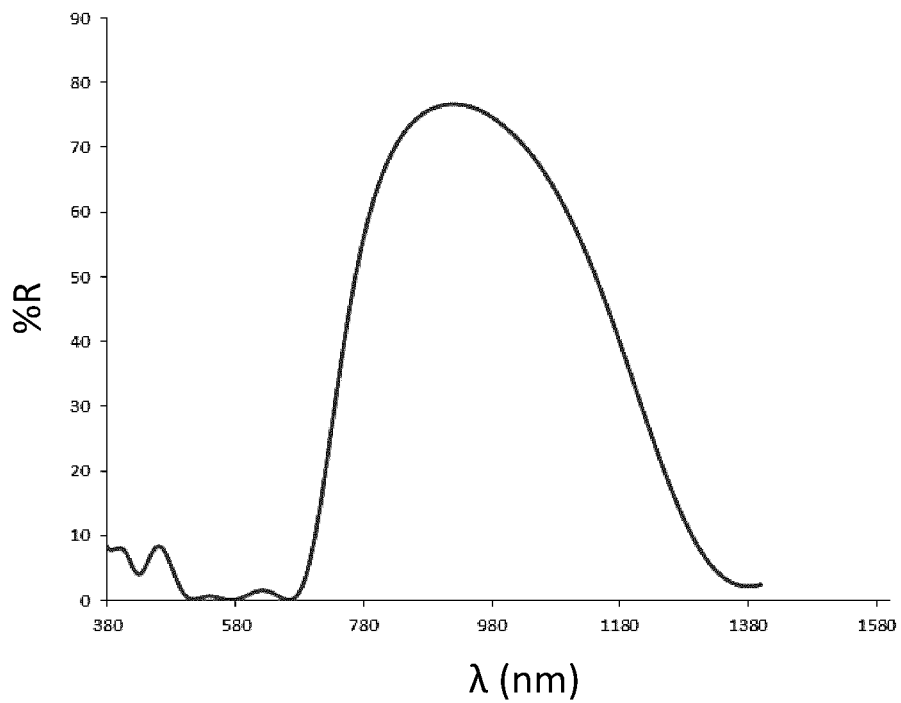
FIG. 17 shows a reflectance of an AR coating in accordance with some embodiments. The drawings are of schematic nature and elements therein may be of different scale or positioned differently to improve readability.

In another embodiment, the first coating and/or the second coating may be a plastic film coated with AR coating which is configured to reflect the light signal. One example of such AR coating has a reflectance as shown in FIG. 17. An AR coating may be deposited onto the spectacle frames directly. Alternatively, the AR coating may also be deposited on a plastic film before it is attached to the frame. The plastic film may be trimmed to the desired size before it is attached to the frame.

The invention claimed is:

1. A method of determining an attitude of an eyewear, the eyewear comprising a first lens comprising a first coating, the first coating having reflection in the non-visible range of wavelengths and comprising a pattern with an orientation, the method comprising:
    detecting a light signal with a digital device comprising a light sensor for the non-visible wavelength range; and
    calculating, using the light signal, an attitude of the eyewear,
    wherein the light signal is signal in the non-visible range reflected from the at least first coating when the eyewear is within a sensor range, and
    wherein the attitude is at least one of: a yaw angle, a pitch angle, a roll angle,
    wherein the light signal comprises a first signal and a second signal, wherein the eyewear is configured to reflect light of the first signal and of the second signal, wherein the first signal is reflected by the first coating at a first location of the eyewear, and the second signal is reflected by a second coating at a second location of the eyewear, wherein the method comprises determining:

the yaw angle, which comprises: determining, with the first light signal, a first distance between the eyewear to the sensor, determining, with the second light signal, a second distance between the eyewear to the sensor, using the first distance and the second distance to calculate the yaw angle; or the pitch angle, which comprises: determining, with the first light signal, a deviation from a first maximal signal intensity, and using the deviation to calculate the pitch angle; or the roll angle, which comprises: determining, with the first light signal, a first deviation from a first maximal signal intensity, determining, with the second light signal, a second deviation from a second maximal signal intensity, using the first deviation and the second deviation to calculate the roll angle.

2. The method of claim 1, further comprising:

determining reference coordinates of the digital device; and using the reference coordinates for calculating the attitude of the eyewear.

3. The method of claim 1, wherein the first signal is of a first wavelength and the second signal is of a second wavelength different from the first wavelength.

4. The method of claim 1, comprising determining the roll angle, which comprises:

determining, with the first light signal, a first deviation from a first maximal signal intensity, determining, with the second light signal, a second deviation from a second maximal signal intensity, using the first deviation and the second deviation to calculate the roll angle.

5. The method of claim 1, wherein detecting a light signal comprises capturing an image of a pattern of the eyewear, and calculating the attitude of the eyewear comprises:

determining a deviation between the captured image and a pre-determined pattern; and using the deviation to calculate the attitude.

6. The method of claim 5, wherein the attitude includes the roll angle and wherein determining the deviation comprises identifying an orientation of the pattern; and wherein calculating the roll angle comprises calculating the angular difference of the orientation using the pre-determined pattern as reference.

7. The method of claim 5, wherein determining the deviation comprises identifying a first dimension and a second dimension of the pattern, wherein the first dimension and the second dimension intersect, and wherein the attitude includes one or both of the pitch angle and the yaw angle, and calculating on or both of the pitch angle and the yaw angle comprises calculating the difference of the first dimension and/or the second dimension from the pre-determined pattern.

8. The method of claim 1, wherein the light sensor is selected from at least one of: an infrared camera, an infrared time-of-flight sensor, a non-imaging infrared sensor.

9. An eyewear for carrying out the method of claim 1, the eyewear comprising at least a first coating having reflection in the non-visible range of wavelengths, and further comprising a first lens comprising the first coating, wherein the first coating comprises a pattern with an orientation.

10. The eyewear of claim 9, wherein the eyewear further comprises a second lens, and the second lens has a second coating comprising a same pattern of the first coating of the first lens.

11. A non-transitory computer program product comprising instructions which, when the program is executed by a digital device, causes the digital device to carry out the method of claim 1.

12. The non-transitory computer program product of claim 11, wherein the instructions further comprise:

determining a difference between the attitude and a pre-determined attitude reference, and initiating a user alert when the difference is larger than a pre-determined threshold.

* * * * *